(12) United States Patent
Carpreau

(10) Patent No.: US 11,341,479 B2
(45) Date of Patent: May 24, 2022

(54) SYSTEM FOR VERIFYING A USER OF A PAYMENT DEVICE

(71) Applicant: MASTERCARD INTERNATIONAL INCORPORATED, Purchase, NY (US)

(72) Inventor: Bruno Carpreau, Overijse (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 42 days.

(21) Appl. No.: 16/110,109

(22) Filed: Aug. 23, 2018

(65) Prior Publication Data

US 2019/0066091 A1    Feb. 28, 2019

(30) Foreign Application Priority Data

Aug. 29, 2017 (EP) ..................................... 17188339

(51) Int. Cl.
*G06Q 20/00* (2012.01)
*G06Q 20/32* (2012.01)
*G06Q 20/40* (2012.01)

(52) U.S. Cl.
CPC ......... *G06Q 20/3278* (2013.01); *G06Q 20/00* (2013.01); *G06Q 20/401* (2013.01)

(58) Field of Classification Search
CPC ...... G06Q 20/40; G06Q 20/401; G06Q 20/12; G06Q 20/405; G06Q 20/10; G06Q 20/20; G06Q 20/385

(Continued)

(56) References Cited

U.S. PATENT DOCUMENTS 8,127,982 B1 *   3/2012   Casey .............. G06Q 20/35785
                                                      235/379
8,401,904 B1 *   3/2013   Simakov ............. G06Q 20/405
                                                      705/16

(Continued)

FOREIGN PATENT DOCUMENTS

CN     101980310 A     2/2011
CN     102521748 A     6/2012

(Continued)

OTHER PUBLICATIONS

"Search Report Issued in European Application No. EP 17 18 8339", dated Nov. 29, 2017, 8 Pages.

(Continued)

*Primary Examiner* — Bennett M Sigmond
*Assistant Examiner* — Xavier M. Bennett
(74) *Attorney, Agent, or Firm* — Talem IP Law, LLP

(57) ABSTRACT

A payment system is disclosed including a point of sale device and an issuer. A payment device can be used to initiate a first payment request with a contactless reader. The first payment request is transmitted to an issuer. If the issuer refuses the payment request, then the point of sale device stores information related to the payment device (such as the Primary Account Number) in a storage unit. When a second payment request is received from the payment device the point of sale device can check whether information related to the payment device matches the information stored in the storage unit. If a match is found, then the point of sale device can request verification from a user by way of a user verification unit.

12 Claims, 3 Drawing Sheets

(58) Field of Classification Search
USPC .......................................................... 700/44
See application file for complete search history.

(56) References Cited

U.S. PATENT DOCUMENTS

| | | | |
|---|---|---|---|
| 8,626,592 B2 | 1/2014 | Simakov et al. | |
| 2003/0204475 A1* | 10/2003 | Cuda | G06Q 20/382 |
| | | | 705/64 |
| 2010/0146263 A1* | 6/2010 | Das | G06Q 20/425 |
| | | | 713/155 |
| 2010/0280958 A1* | 11/2010 | Hasson | G06Q 20/40 |
| | | | 705/75 |
| 2011/0016052 A1* | 1/2011 | Scragg | G06Q 20/405 |
| | | | 705/44 |
| 2013/0024289 A1* | 1/2013 | Cueli | G06Q 30/00 |
| | | | 705/14.65 |
| 2013/0151292 A1* | 6/2013 | Van Deloo | G06Q 10/02 |
| | | | 705/5 |
| 2013/0232073 A1* | 9/2013 | Sheets | H04L 9/3231 |
| | | | 705/44 |
| 2014/0297438 A1 | 10/2014 | Dua | |
| 2015/0120512 A1* | 4/2015 | Chen | G06Q 20/12 |
| | | | 705/27.1 |
| 2015/0142592 A1* | 5/2015 | Chauhan | G06Q 20/202 |
| | | | 705/21 |
| 2015/0287024 A1 | 10/2015 | Hui et al. | |
| 2015/0371233 A1* | 12/2015 | Simakov | G06Q 20/4037 |
| | | | 705/44 |
| 2016/0094991 A1* | 3/2016 | Powell | G06Q 20/32 |
| | | | 455/411 |
| 2016/0132880 A1 | 5/2016 | O'Regan et al. | |
| 2016/0253667 A1* | 9/2016 | Jacob | G06Q 20/3223 |
| | | | 705/64 |
| 2017/0124570 A1* | 5/2017 | Nidamanuri | G06Q 20/409 |
| 2017/0278094 A1* | 9/2017 | Mackie | G06Q 20/3224 |
| 2018/0144332 A1* | 5/2018 | Shauh | G06Q 20/325 |
| 2018/0268395 A1* | 9/2018 | Donk | G06Q 20/20 |
| 2019/0066091 A1* | 2/2019 | Carpreau | G06Q 20/3278 |
| 2019/0156330 A1* | 5/2019 | Altenhofen | G06Q 20/40 |

FOREIGN PATENT DOCUMENTS

| | | | |
|---|---|---|---|
| CN | 103299328 A | 9/2013 | |
| CN | 103794000 A | 5/2014 | |
| CN | 105335851 A | 2/2016 | |
| CN | 105488670 A | 4/2016 | |
| CN | 105518732 A | 4/2016 | |
| CN | 105654286 A | 6/2016 | |
| CN | 107004193 A | 8/2017 | |
| GB | 2533333 A * | 6/2016 | ......... G06Q 20/3278 |
| GB | 2533333 A | 6/2016 | |

OTHER PUBLICATIONS

Office Action Issued in Chinese Application No. 201810874035.6, dated May 28, 2021, 9 pages.

* cited by examiner

SYSTEM FOR VERIFYING A USER OF A PAYMENT DEVICE

BACKGROUND

Today many payments are made electronically. To authorize a payment transaction, the user needs to present a genuine and valid device (typically a debit or credit card), and some kind of user verification (such as a personal identification number or PIN). This allows the issuer of the credit or debit card to verify the identity of the user so that the transaction can be processed.

More recently credit and debit cards have been provided with contactless technology that allow payments to be authorized when a card is presented to a contactless card reader. Typically, these contactless payments without any verification of the user are allowed up to a maximum value, such as GBP 30. This provides a convenient mechanism for the user to pay for items quickly.

One challenge for providers of contactless payment cards is that they are vulnerable to abuse if lost or stolen. This is mitigated by the presence in the point of sale terminal, of a maximum payment amount for transactions without requiring user verification. However, a lost or stolen card can still be used for an unrestricted number of transactions without any user verification, as long as the amount of each transaction is below this maximum. To counteract this problem, some contactless payment cards and devices include internal counters that maintain the cumulative number and/or the monetary amount of unverified transactions that have occurred with the device. When a new unverified transaction is initiated, the payment device checks whether adding the new transaction would make the cumulative number and/or the monetary amount of unverified transactions to exceed pre-defined thresholds as set by the issuer. If this is the case, the user may be prompted to insert their card into the point of sale terminal and to verify their identity (e.g. by entering a valid PIN). Upon successful verification of the user's identity, the issuer can send a command to the payment device, still present in the point of sale terminal, resetting its internal counters. Subsequently, the user can use the device again for a certain number and/or amount of unverified transactions.

Recent developments in payments have attempted to diversify the number and type of devices that can be used for payments. In particular, it would be desirable to enable contactless payments to be made using wearable devices such as watches and wristbands. These payment devices are only capable of initiating contactless payments, and they may lack any user interface that might be used for user verification. Therefore, the approach to mitigate the risk of illicit use of lost and stolen devices as described above might not be possible, as it involves a contact transaction to allow the issuer to send a command to reset the internal counters for unverified transactions.

BRIEF SUMMARY

The present disclosure relates to a system and method for improving the security of payment devices, in particular contactless payment devices that use near field communication (NFC).

According to an aspect of the disclosure there is provided a method of verifying a user associated with a payment device, comprising the steps of: receiving a first payment request from the payment device; communicating with an issuer to request authorization of the first payment request; receiving an indication of a refusal of the first payment request from the issuer; storing information related to the payment device that is associated with the refused transaction; receiving a second payment request from the payment device; requesting verification from a user if it is determined that the second payment request is initiated by the payment device for which information has been stored; receiving verification information from the user; verifying the identity of the user based on the received verification information; and communicating with the issuer to request authorization of the second payment request, based on successful verification of the user.

In this way, the issuer can decline a first payment request. One reason for declining the first payment request may be a determination that the user of the payment device requires verification. If payment is attempted again by the user in the second payment request then this can be detected at the point of sale device, based on the stored information relating to the refused transaction.

Verification of the user can occur by obtaining something the genuine user knows (e.g. a PIN), or an inherent trait of the genuine user (e.g. a fingerprint or iris scan). This information is sent to the issuer together with the second payment request, allowing the issuer to verify the user prior to authorizing and processing the payment. In this way, issuers can maintain a record of the amount and/or number of unverified transactions at their authorization host system, and mitigate the risk of illicit transactions made by lost or stolen devices by requiring user verification based on these records. This may also remove the need to have counters present in the payment device itself in order to manage this risk.

In some cases, the first and second payment requests are contactless payment requests. One of the aims of contactless payment devices is to enable users to complete payment transactions quickly, without entering a PIN code or providing other kinds of identification for verification. However, this also makes contactless devices vulnerable when lost or stolen. The method may be particularly useful when applied to payment devices that can only be used for contactless payments, and which lack an ability to verify the user directly. Contactless payment devices like these are envisaged for use in a number of wearable devices including watches and wristbands.

In some cases, the issuer provides refusal of the first payment request when it is determined that verification of the user is required. The issuer may determine that verification of the user is required for a variety of reasons. For example, it may be determined that verification of the user is required based on a comparison of data stored at the issuer relating to the payment device and a threshold. The stored data at the issuer relating to the payment device may include the number of unverified transactions or the value of unverified transactions. Thus, if the payment device has been used in more than a predetermined number of transactions then verification of the user may be required. If the payment device was lost or stolen, then the new bearer may be able to use the device for payments only until the threshold in the issuer's authorization host system is reached. In one example the issuer threshold may be ten unverified transactions.

As an alternative the threshold in the issuer's authorization host system may relate to the cumulated value of transactions, rather than their number. For example, the issuer may permit unverified transactions up to a predetermined value, such as €100.

The issuer could also determine that verification of the user is required based on other behaviors. For example, a sudden increase in the rate of payments may prompt the issuer to request verification. In another example, a change in the geographic location or pattern of payment requests may prompt the issuer to request verification.

The issuer can maintain a count of the number of unverified transactions or the value of unverified transactions for comparison against a threshold. This may be contrasted with other approaches where a count is maintained in the payment device. Advantageously this can improve security for devices that lack the ability to maintain an internal counter, or that lack an ability to communicate with the issuer so that an internal counter can be reset once a threshold is exceeded. These include devices that can only be used for contactless payments, since their method of use prevents an issuer from resetting an internal counter.

In some cases, the stored data at the issuer are reset based on successful verification of the user. The counter at the issuer regarding the number of unverified transactions and/or the cumulated value of unverified transactions can be set to zero when a successful verification occurs and is communicated to the issuer by the point of sale device.

In some cases, the method is performed in a point of sale device and the information related to the payment device that is associated with the refused transaction is stored in a storage unit in the point of sale device. In this way, a modified point of sale device can be used to prompt verification of the user. In a typical scenario, a user would present their payment device to the point of sale device, and the transaction may be refused by the issuer if certain criteria are met. The user would then present their payment device to the point of sale device again in order to re-attempt payment (in the second payment request). The point of sale device would determine that the payment device relates to a refused transaction based on the information in the storage unit, and this can be used to prompt verification of the user.

The method may involve displaying information related to the refusal of the first payment request on a point of sale device. In this way, the user and the merchant can be made aware of the refusal of the first payment request. The method may also include displaying a reason for the refusal. In one example, the point of sale device may display an indication that the first payment request has been refused because the user has not been recently verified. This may prompt the user to present the payment device to the payment device reader again, which prompts verification of the user via the user verification unit.

It is possible that, following refusal of the first payment request, a user would not attempt a second payment request. In these circumstances the user may attempt payment at a later time using a different point of sale device. In these circumstances the payment request would also be refused. However, the user may go on to complete verification using the different point of sale device. In these circumstances the first point of sale device would continue to store information relating to the payment device and the refused transaction. There are a number of ways in which this could be handled. First, the information regarding the refused transaction could continue to be stored at the first point of sale device. Thus, if the user attempted to use the first payment device again then verification would be requested, even though the counter at the issuer does not require the user to be verified. Alternatively, the stored information at the first payment device could exist only for a predetermined time period or for a predetermined number of refused transactions. Thus, if the user did not immediately make a second payment request, the point of sale device could assume that they have moved on elsewhere, and would, once more, pass the first payment request to the issuer for acceptance/refusal. This alternative arrangement may be preferred because it would reduce unnecessary verifications of the user.

According to another aspect of the disclosure there is provided a point of sale device comprising: a payment device reader; a processor; a user verification unit; a communication module configured to communicate with an issuer; and a storage unit; wherein the payment device reader is configured to receive a first payment request from a payment device; wherein the communication module is configured to communicate with the issuer to request authorization of the first payment request; wherein the communication module is configured to receive an indication of a refusal of the first payment request from the issuer; wherein the processor is configured to store information related to the payment device that is associated with the refused transaction in the storage unit; wherein the payment device reader is configured to receive a second payment request from the payment device; wherein the processor is configured to request verification from a user by determining that the second payment request is from the payment device for which information is stored in the storage unit; wherein user verification unit is configured to receive verification information from the user and to verify the user; and wherein the communication module is configured to communicate with the issuer to request authorization of the second payment request, based on successful verification of the user.

The point of sale device may be provided as an integrated unit, or the various components could be distributed in a number of separate devices. In particular, the storage unit could be provided within the integrated unit or it could be provided elsewhere and accessed over a network.

In some cases, the payment device reader is a contactless payment device reader. The contactless payment device reader and the payment device may use near field communication (NFC) technology such as radio frequency identification (RFID).

According to yet another aspect of the disclosure there is provided a payment system comprising: the point of sale device as previously defined, and an issuer, configured to communicate with the point of sale device.

The payment system may also include the payment device. In some cases, the payment device is configured only for contactless payments and lacks a facility for user verification. For example, the payment device may be a watch or other wearable device that lacks conventional user identification means such as a user interface or fingerprint reader.

The user verification unit may be a user interface with which the user can enter a PIN. Alternatively, the user verification unit may be a fingerprint reader or some other biometric reader.

According to yet another aspect of the disclosure there is provided a computer readable medium comprising computer executable instructions which, when executed on a computing system, cause a processor of the computing system to perform a method comprising: receiving a first payment request from the payment device; communicating with an issuer to request authorization of the first payment request; receiving indication from the issuer of refusal of the first payment request; storing information related to the payment device that is associated with the refused transaction; receiving a second payment request from the payment device; requesting verification from a user if it is determined that the second payment request is from the payment device for which information is stored; receiving verification information from the user; and communicating with the issuer to request authorization of the second payment request, based on successful verification of the user.

The computer readable medium may be provided at a download server, and the computer executable instructions may be downloaded to a point of sale device. In this way, a software upgrade may be provided to a point of sale device to enable operation of the steps described above.

BRIEF DESCRIPTION OF THE DRAWINGS

Example embodiments of the invention are now described, by way of example, with reference to the drawings, in which.

DETAILED DESCRIPTION

Figure 1:
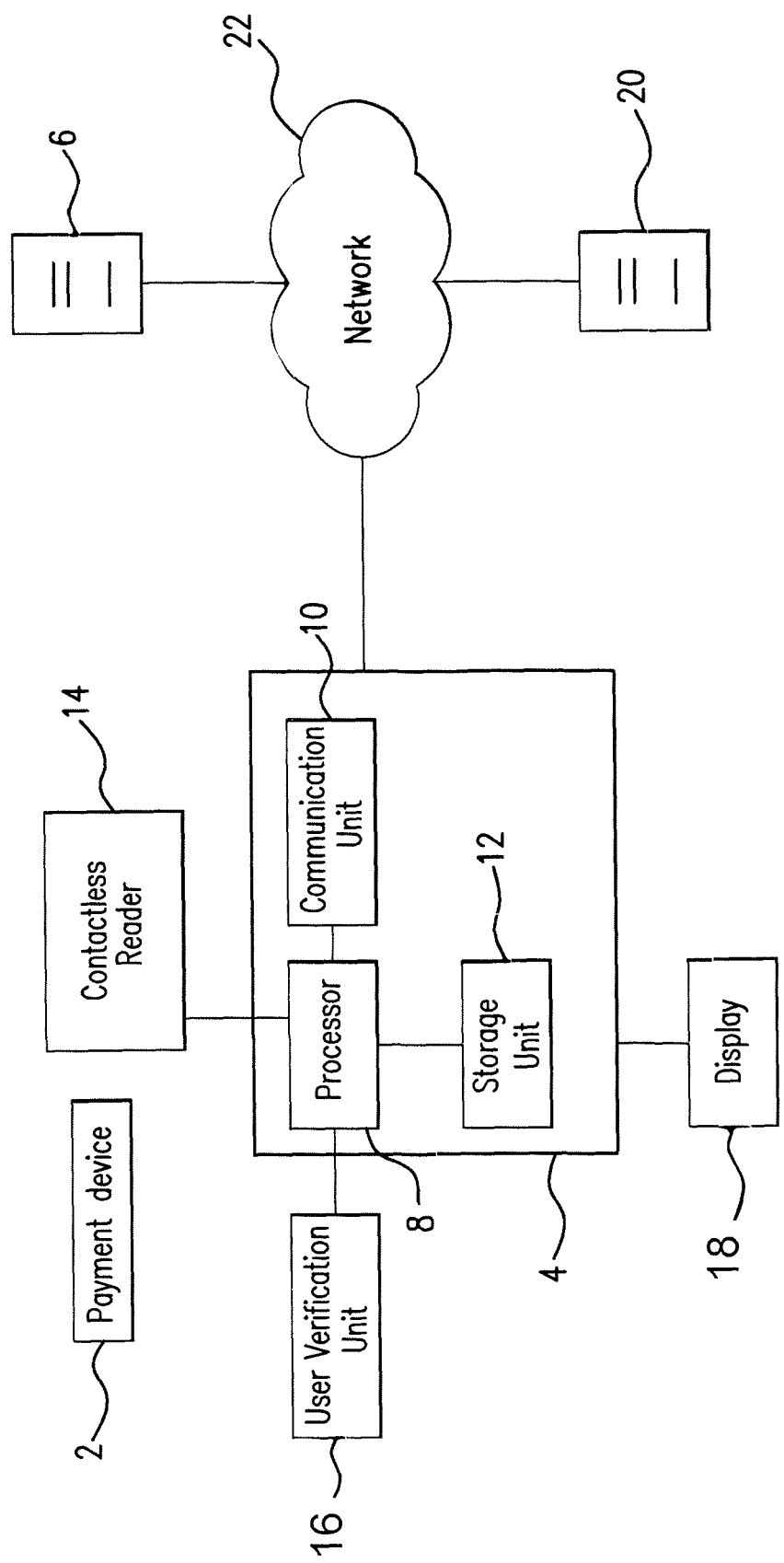
FIG. 1 is a schematic view of a payment system in an embodiment of the present invention.

FIG. 1 is a schematic view of a payment system, including a contactless payment device 2, a point of sale device 4 and an issuer 6. The point of sale device comprises a processor 8 and a communication unit 10. The point of sale device 4 is configured to communicate with the issuer 6 over a network 22. The point of sale device 4 also includes a display screen 18.

The point of sale device 4 includes a contactless reader 14 which is designed to interact with the contactless payment device 2 using near field communication (NFC), as is known in the art. The point of sale device 4 also includes a storage unit 12 and a user verification unit 16. The user verification unit 16 may be embodied as a keypad with which a user can enter a PIN. Alternatively, the user verification unit 16 may be embodied as a fingerprint reader or some other biometric reader.

The payment system also includes a download server 20. The download server 20 is configured to communicate with the point of sale device 4 and/or the issuer 6 over the network 22. The download server 20 can provide software upgrades to the point of sale device 4.

Figure 2:
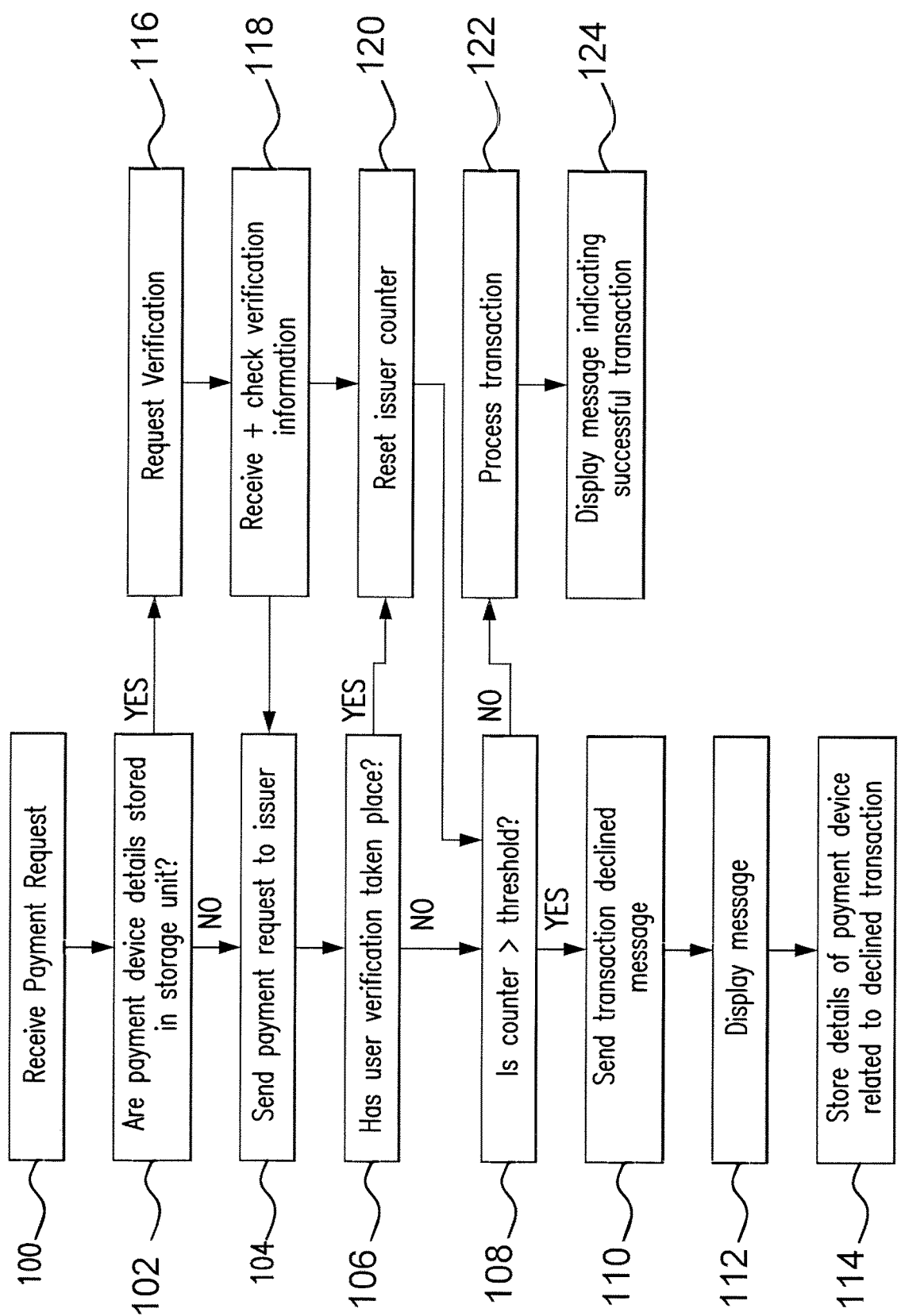
FIG. 2 is a flow chart illustrating operations that can occur in a payment system in an embodiment of the present invention.

FIG. 2 is a flow diagram showing operation of the payment system in an embodiment of the invention. At step 100 the point of sale device 4 receives a (first) payment request from a user. This is achieved when the user presents their payment device 2 to the contactless reader 14. At step 102 the processor 8 in the point of sale device 4 checks whether any details relating to the payment device are stored in the storage unit 12 that relate to a refused payment. If no details are found then, at step 104, the communication unit 10 sends the payment request to the issuer 6 over the network 22.

At step 106 the issuer 6 determines whether user verification has occurred at the point of sale device 4. For a typical contactless payment request there will have been no user verification.

At step 108 the issuer 6 determines whether the payment request received from the communication unit 10 can be allowed. In step 108 the issuer 6 determines whether a counter that it maintains for the number of unverified transactions relating to that payment device exceeds a threshold value. If the count of unverified transactions is greater than the threshold value then, at step 110, the issuer 6 will send a message to the point of sale device 4 to indicate that the first payment request is refused.

The point of sale device 4 receives the indication of a refused payment request from the issuer 6 then, at step 112, displays a message on the display screen 18 indicating that the transaction has been refused. The displayed message can indicate that the number of unverified transactions has been exceeded and that user verification is required. At step 114 the point of sale device 4 stores details of the payment device 2 that is associated with the refused transaction in the storage unit 12. In one example the primary account number (PAN) of the payment device 2 may be stored.

The process illustrated in FIG. 2 can begin again when another payment request (a second payment request) is received at step 100. This is achieved when the user presents their payment device 2 to the contactless reader 14. In some embodiments, the user may actually be prompted to present their payment device 2 to the contactless reader 14 again by the message displayed on the display screen 18. Alternatively, the user may simply attempt a second payment in response to the refusal of the first transaction.

At step 102 the processor 8 in the point of sale device 4 checks whether any details relating to the payment device are stored in the storage unit 12 that relate to a refused payment. On this occasion the processor 8 will find the details of the payment device 2 relating to the previous payment request in the storage unit 12. At step 116 the processor 8 requests verification from the user. The verification request may be displayed to the user on the display screen 18.

At step 118 the user verification unit 16 receives verification information from a user. In example embodiments the verification information may be a fingerprint or a PIN, which is entered via a numeric keypad The verification of the user's identity can be achieved by comparing the received verification information with verification information stored in the payment device 2, or more likely in case of a contactless transaction, retrieved from a server at issuer 6 over the network 22 prior to authorizing the (second) payment request.

At step 104 the point of sale device 4 communicates with the issuer 6 to request authorization of the (second) payment request, including verification information of the user. At step 106 the issuer 6 determines whether the submitted user verification information matches user verification information retrieved from its internal storage. If a match is confirmed, the point of sale device 4 sends the issuer 6 a message indicating that the user has successfully completed a verification check. Thus, at step 120 the issuer 6 resets the counter that it maintains for the number of unverified transactions relating to that payment device.

At step 108 the issuer 6 determines whether the counter that it maintains for the number or the cumulative amount of unverified transactions relating to that payment device exceeds a threshold value. Since the counter has been reset to zero at step 120, the counter will be less than the threshold value. Therefore, at step 122 the issuer 6 processes the transaction, provided that the funds are available and other anti-fraud checks are satisfied. At step 124 the point of sale device 4 can display a message on the display screen 18 indicating that the transaction has been successful.

Figure 3:
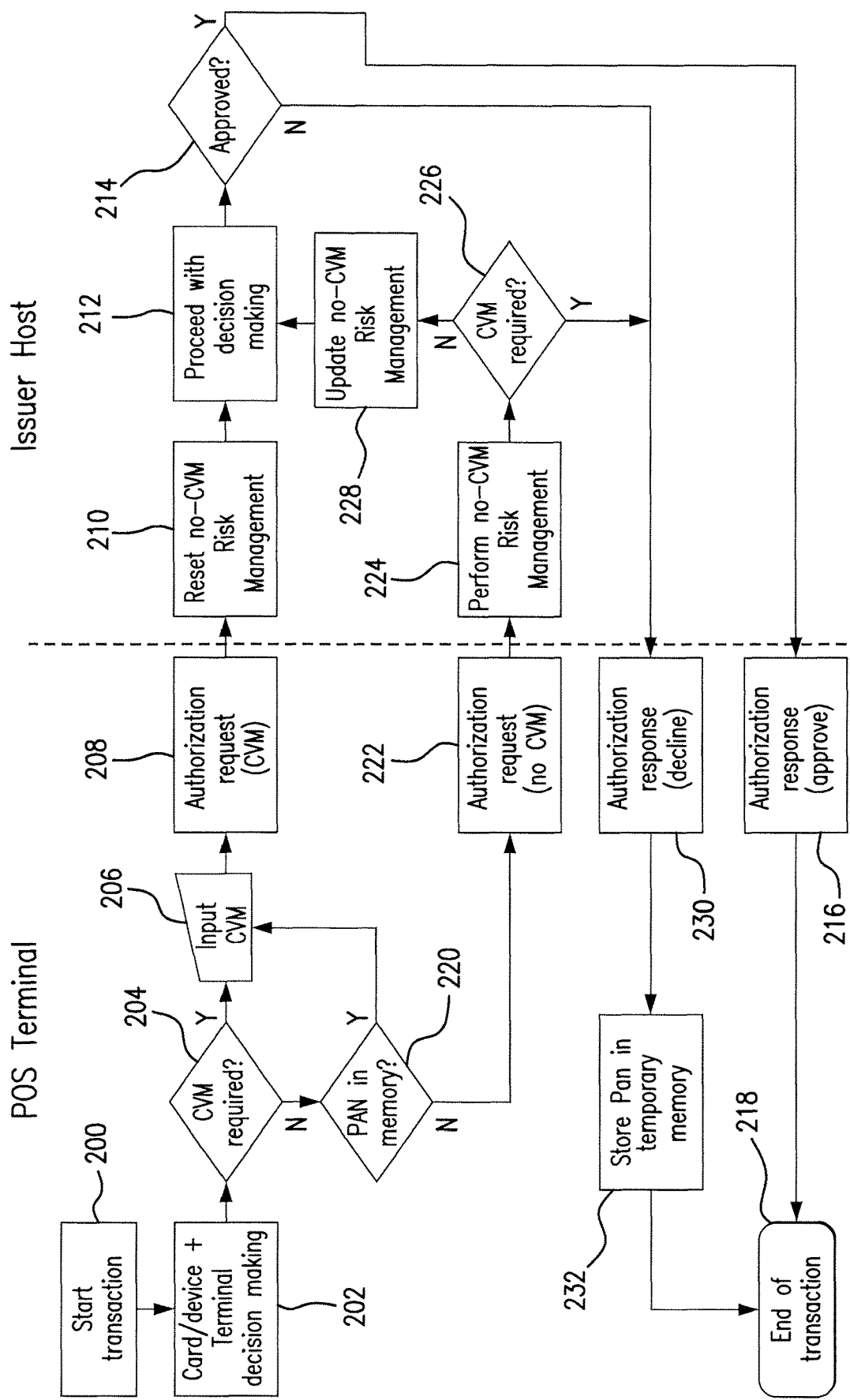
FIG. 3 is another flow chart illustrating operations that can occur in a payment system in another embodiment of the present invention.

FIG. 3 is another flow diagram indicating steps that can be performed in an embodiment of the invention, and indicating those steps that are performed at the point of sale device 4 (POS terminal), and those steps that are performed at the issuer 6 (issuer host). In this example, the transaction starts at step 200 when a user device (e.g., payment device 2) is presented to the POS terminal, for example via the contactless reader 14 (see step 202 indicating card/device and terminal decision making). At step 204 the processor 8 determines whether user verification (CVM) is required. In this example, user verification would be required for traditional contactless payment devices which maintain an internal counter regarding the number of unverified transactions, and where it is determined that the counter exceeds a threshold value. User verification is not normally required for contactless payment devices that lack an internal counter.

If user verification is required, then it is requested, and the user provides verification information using the user verification unit 16 at step 206. An authorization request is than transmitted from the communication unit 10 to the issuer 6 at step 208. The authorization request transmitted at step 208 includes an indication that user verification (CVM) has occurred. The issuer 6 also maintains a count of the number of unverified transactions for each payment device. At step 210 the counter maintained by the issuer 6 is reset to zero. At step 212 the issuer 6 determines whether to allow the payment authorization request based on the availability of funds and other anti-fraud checks. If the request is approved at step 214 then a message is delivered to the point of sale device at step 216. The transaction is then ended at step 218.

If no user verification is required at step 204 then at step 220 the point of sale device 4 checks whether information relating to the payment device is stored in the storage unit 12. If the primary account number (PAN) is not stored in the storage unit then at step 222 the communication unit 10 transmits an authorization request to the issuer 6. The authorization request transmitted at step 222 includes an indication that no user verification has occurred (no CVM). At step 224 the issuer 6 determines whether the counter that it maintains for the number or the cumulative amount of unverified transactions relating to that payment device exceeds a threshold value. If the threshold is not exceeded at step 226 then the counter is updated at step 228 to reflect the fact that a further unverified transaction has occurred. The issuer 6 then proceeds with a decision on whether to approve the transaction at step 212. If at step 226 it is determined that the threshold is exceeded, then a message is delivered to the point of sale device 4 at step 230 indicating that the transaction is declined. In these circumstances the point of sale device 4 stores details of the PAN relating to the declined transaction in the storage unit 12 at step 232. The transaction then ends at step 218.

If a transaction occurs where no user verification is required at step 204, but, at step 220, a PAN matching that of the payment device 2 is stored in the storage unit 12 then user verification is requested at step 206. Thus, if a first payment request has been declined and the PAN is stored in the storage unit 12 at step 232, then user verification will be requested on receipt of a second payment request involving the same payment device 2.

Embodiments may be implemented as a computer-implemented method, a computing system (e.g., POS device, issuer device), or as an article of manufacture (e.g., a computer program product or computer-readable medium). Certain computer program products may be one or more computer-readable storage media readable by a computer system and encoding a computer program of instructions for executing a computer process. It should be understood that as used herein, in no case do the terms "storage unit", "storage media", "computer-readable storage media" or "computer-readable storage medium" consist of transitory, propagating signals.

The invention claimed is:

1. A method of verifying a user associated with a contactless payment device that lacks a user interface for user verification, comprising:
   receiving a first payment request for a transaction from a wearable device at a point of sale device that does not maintain an internal counter for unverified transactions;
   communicating with an issuer to request authorization of the first payment request for the transaction;
   receiving an indication of a refusal of the first payment request for the transaction from the issuer, wherein the issuer provides refusal of the first payment request for the transaction when it is determined that verification of the user is required, wherein the issuer determines that verification of the user is required based on a comparison of data stored at the issuer relating to the wearable device and a threshold, wherein the stored data at the issuer relating to the wearable device includes a number of unverified transactions or a value of unverified transactions, and wherein the stored data at the issuer are reset based on successful verification of the user;
   in response to receiving the indication of the refusal of the first payment request, storing information related to the wearable device that is associated with the refused transaction, wherein the information related to the wearable device comprises a primary account number (PAN);
   receiving a second payment request;
   determining whether the second payment request is from the wearable device for which information is stored, wherein the determining whether the second payment request is from the wearable device for which information is stored comprises checking whether the second payment request comprises the PAN;
   requesting verification from a user if it is determined that the second payment request is from the wearable device for which the information of the PAN is stored;
   receiving verification information from the user;
   verifying an identity of the user based on the received verification information; and
   communicating with the issuer to request authorization of the second payment request, based on successful verification of the user.

2. The method of claim 1, wherein the first and second payment requests are contactless payment requests.

3. The method of claim 1, wherein the threshold comprises a cumulative number and/or monetary amount.

4. The method of claim 1, wherein the method is performed in the point of sale device and the information related to the wearable device that is associated with the refused transaction is stored in a storage unit in the point of sale device.

5. The method of claim 1, further comprising displaying information related to the refusal of the first payment request on a point of sale device.

6. A payment system comprising:
   a point of sale device comprising:
      a payment device reader;
      a processor;
      a user verification unit;
      a communication module for transmitting and receiving communications over a network; and
      a storage unit;
      wherein the point of sale device does not maintain an internal counter for unverified transactions,
      wherein the point of sale device is configured to:

receive, via the payment device reader, a first payment request for a transaction from a wearable device;

communicate, via the communication module, with an issuer to request authorization of the first payment request for the transaction;

receive, via the communication module, an indication of a refusal of the first payment request for the transaction from the issuer;

store, via the processor, information related to the wearable device that is associated with the refused transaction in the storage unit of the point of sale device;

receive, via the payment device reader, a second payment request;

request verification from a user when it is determined, via the processor, that the second payment request is from the wearable device for which information is stored in the storage unit;

receive, via the user verification unit, verification information from the user; and communicate, via the communication module, with the issuer to request authorization of the second payment request, including user verification data; and an issuer, configured to communicate with the point of sale device, wherein the issuer is configured to:

provide refusal of the first payment request for the transaction when it is determined that verification of the user is required; and determine that verification of the user is required based on a comparison of data stored at the issuer relating to the wearable device and a threshold, wherein the stored data at the issuer relating to the wearable device includes a number of unverified transactions or a value of unverified transactions, wherein the stored data at the issuer are reset based on successful verification of the user.

7. The payment system of claim 6, wherein the payment device reader is a contactless payment device reader.

8. A computer readable storage medium comprising computer executable instructions which, when executed by a processor, direct the processor to:

receive a first payment request for a transaction from a wearable device at a point of sale device that does not maintain an internal counter for unverified transactions;

communicate with an issuer to request authorization of the first payment request;

receive an indication of refusal of the first payment request for the transaction from the issuer, wherein the indication of refusal of the first payment request for the transaction is provided by the issuer when verification of a user is required, wherein the issuer determines that verification of the user is required based on a comparison of data stored at the issuer relating to the wearable device and a threshold, wherein the stored data at the issuer relating to the wearable device includes a number of unverified transactions or a value of unverified transactions, wherein the stored data at the issuer are reset based on successful verification of the user;

in response to the indication of the refusal of the first payment request, store information related to the wearable device that is associated with the refused transaction, wherein the information related to the wearable device comprises a primary account number (PAN);

receive a second payment request;

determine whether the second payment request is from the wearable device for which information is stored, wherein the determining whether the second payment request is from the wearable device for which information is stored comprises checking whether the second payment request comprises the PAN;

request verification from a user if it is determined that the second payment request is from the wearable device for which the information of the PAN is stored;

receive verification information from the user; and communicate with the issuer to request authorization of the second payment request, including user verification data.

9. The medium of claim 8, wherein the first and second payment requests are contactless payment requests.

10. The medium of claim 8, wherein the instructions further direct the processor to display information related to the refusal of the first payment request on a point of sale device.

11. The medium of claim 8, wherein the processor executing the instructions is in the point of sale device.

12. The method of claim 1, wherein the received verification information comprises a personal identification number or biometric information.

* * * * *